(No Model.)
G. S. ROBINSON.
LOCK NUT.
No. 323,078. Patented July 28, 1885.
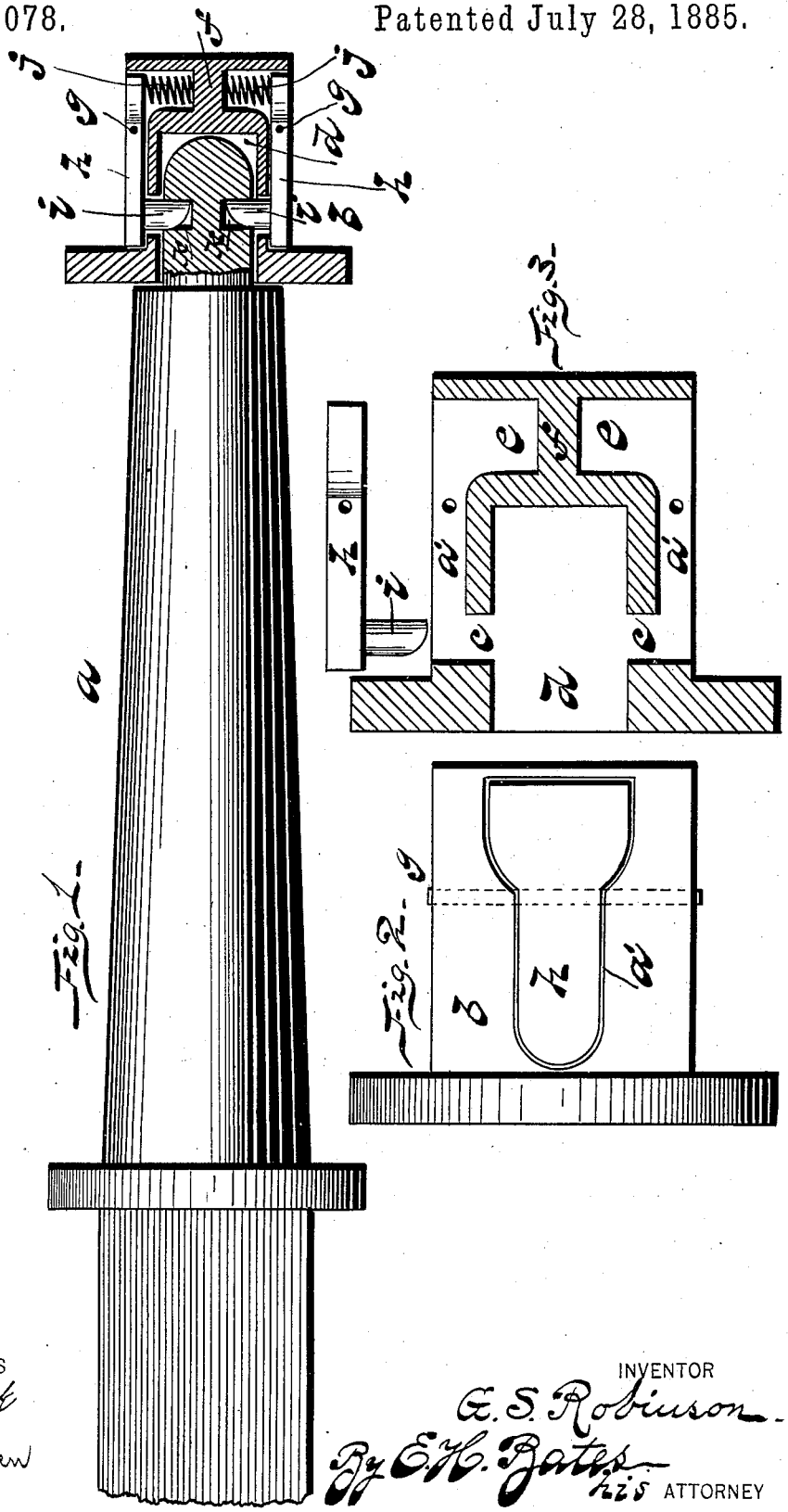
WITNESSES
Jas. Y. Clark
Frank Bowen
INVENTOR
G. S. Robinson
By E. H. Bates
ATTORNEY

UNITED STATES PATENT OFFICE.

GEORGE S. ROBINSON, CANASTOTA, NEW YORK.

LOCK-NUT.

SPECIFICATION forming part of Letters Patent No. 323,078, dated July 28, 1885.

Application filed April 22, 1885. (No model.)

*To all whom it may concern:*

Be it known that I, GEORGE S. ROBINSON, a citizen of the United States, residing at Canastota, in the county of Madison and State of New York, have invented certain new and useful Improvements in Lock-Nuts, of which the following is a specification, reference being had therein to the accompanying drawings.

This invention has relation to improvements in nuts for vehicle-axles and bolts; and it consists in the construction and novel arrangement of parts, as will be hereinafter fully explained, and particularly pointed out in the appended claims.

The annexed drawings to which reference is made fully illustrate my invention, in which—

Figure 1 represents a vertical sectional view of my device. Fig. 2 is a plan view of the same, and Fig. 3 is a vertical section of the nut removed from the axle.

Referring by letter to the accompanying drawing, $a$ designates the spindle of a vehicle-axle, and $b$ represents the nut applied to the end thereof. This nut $b$ is constructed with an upper and lower recess, $a'$, which are longitudinally arranged therein, and communicating at one end thereof with the vertical opening $c$, which in turn communicates with the large annular recess $d$ in the nut. The opposite ends of said longitudinal recesses also communicate with vertical recesses $e$, which are separated by the wall $f$ of the nut. Within the longitudinal recesses are pivoted, as at $g$, an upper and lower dog, $h$, the inner ends of which are provided with beveled lugs $i$, while the opposite ends thereof have interposed between the same and the wall $e$ springs $j$, which bear against the dogs and keep them in engagement with the spindle or bolt, as will be now explained. The spindle is provided on its outer end with two recesses, $k$, which receive the lugs on the nut and hold the nut in position. At the same time the dogs lie flush with outer surface of said nut.

The operation of locking and unlocking the nut from the spindle or bolt is very simple. The person simply presses the nut on the end of the bolt when applying the nut; the lugs snap into the recesses $k$ and secure the bolt and nut firmly to one another.

In removing the nut from the spindle or bolt the operator simply presses upon the outer ends of the pivoted dogs, thus raising the lugs from engagement with the recesses $k$, when said nut can be readily removed therefrom.

Instead of the recesses $k$ a circular groove may be formed on the end of the spindle to receive the lugs.

It will be seen that this nut can be applied to various uses, such as spindles for vehicles, railway bolts, and, in fact, wherever a nut is required.

Having described my invention, what I claim, and desire to secure by Letters Patent, is—

1. The combination, with the spindle provided with the recesses $k$, of the nut $b$, having the recesses and openings, as shown, and provided with the pivoted dogs $h$, having at one end the lugs $i$, and the spring $j$, the whole adapted to operate as specified.

2. The herein-described nut for spindles, bolts, &c., consisting of nut proper, having the recesses, as shown, and provided with the pivoted dogs $h$, having the lugs $i$, and adapted to be operated upon by means of the springs $j$, whereby the nut is automatically secured to the bolt, as described, and for the purposes specified.

In testimony whereof I affix my signature in presence of two witnesses.

GEORGE S. ROBINSON.

Witnesses:
JOHN H. MCMAHON,
ROBERT FORSTER.